United States Patent Office 2,784,220
Patented Mar. 5, 1957

2,784,220

PROCESS FOR PREPARING 4,4′-DIAMINOSTILBENE-2,2′-DISODIUM SULFONATE AND THE FREE ACID THEREOF

Louis Spiegler, Woodbury, N. J., assignor to E. I. du Pont de Nemours and Company, Wilmington, Del., a corporation of Delaware No Drawing. Application July 17, 1953,
Serial No. 368,806

6 Claims. (Cl. 260—510)

This invention relates to the preparation of 4,4′-diaminostilbene-2,2′-disodium sulfonate, and more particularly to its preparation by the catalytic hydrogenation of 4,4′-dinitrostilbene-2,2′-disodium sulfonate.

The products of the present invention have important commercial uses as intermediates for the preparation of dyes and textile whitening agents. Heretofore these products have been manufactured by reducing the corresponding dinitro compound with iron and acetic acid. This process presents difficulties in that the iron is precipitated as the hydroxide which forms a gelatinous mass that is difficult to filter off from the product. After the hydroxide is precipitated and filtered, the medium must again be made acid to precipitate the 4,4′-diaminostilbene-2,2′-disulfonic acid.

Other methods of reducing the nitro groups are known, such as chemical reductions with alkali sulfhydrates or sulfides. These methods are, however, uneconomical because of the comparatively high cost of the reducing agents and, because the sulfides and other sulfur compounds formed as byproducts, complicate the isolation of the desired amine.

Catalytic reductions have also been proposed, but considerable difficulty is experienced because of hydrogenation at the ethylenic bond. Many catalytic reductions require super-atmospheric pressure which requires special apparatus and added cost.

Such methods have a further disadvantage in that they require non-aqueous solvents and yields are usually low. In addition, these processes usually produce a relatively large amount of colored compounds which make the product unsuitable for many purposes and their separation is expensive and impractical.

It is therefore an object of the present invention to provide a simple economical process for the preparation of 4,4′-diaminostilbene-2,2′-disulfonic acid and its salts under atmospheric conditions. Another object is the preparation of such compounds in an aqueous system with high yields and substantially no colored by-products. Other objects will appear as the description of the invention proceeds.

These and other objects are accomplished by reducing an aqueous solution of 4,4′-dinitrostilbene-2,2′-disodium sulfonate at a pH of 5.6 to 7.0 and a temperature of 70° to 90° C. with hydrogen in the presence of a platinum or palladium catalyst. The hydrogen is introduced in excess so that substantially no unreacted or partially reduced dinitrostilbene compound is present at any moment. The product is then separated from the reaction medium.

In practice the invention is carried out in a very simple manner. An aqueous solution of 4,4′-dinitrostilbene-2,2′-disodium sulfonate is brought to a pH of 5.6 to 7.0. The solution is heated to about 85° C. and is added slowly with agitation to an aqueous suspension of the supported catalyst. Hydrogen is passed through the agitated catalyst suspension, and the rate of adding the dinitro solution is controlled so that no detrimental excess of unreacted nitro compound is present in the catalyst suspension at any moment. When reduction is complete, the formed diamine can be isolated from the solution by conventional evaporation or by acidifying to precipitate the disulfonic acid and then filtering off the 4,4′-diaminostilbene-2,2′-disulfonic acid.

In one of the preferred embodiments of the invention a saturated solution of the dinitro compound is made up in water at 85° to 90° C. which, at this temperature, contains about 20% to 22% of the compound. Lower concentrations may be used, but the increased volume renders the process less economical.

The solution is adjusted to a pH of 5.6 to 7.0 by adding dilute acid or alkali as required. At a pH above 7.0 the process does not operate satisfactorily due to the accumulation of partially reduced nitrobodies which form azo and azoxy derivatives and impart color to the reaction mass. These by-products also cause de-activation of the catalyst so that the process slows up or stops and an impure product is obtained as shown in Example III. If a pH below 5.5 is used, the diaminostilbene disulfonic acid is insoluble. The diamino product is separated from the catalyst by filtration, and hence the pH should be held above 5.5 so that the product will remain in solution.

The water and other materials used in the process must be free from catalyst poisons, particularly copper. One precaution which may be used to eliminate poisons is to add the catalyst to the aqueous dinitrostilbene solution, adjust the pH, heat the solution to 85° to 90° C. for a short time, and then filter off the catalyst prior to reducing the dinitrostilbene solution. This procedure causes the catalyst poisons to be sorbed on to the added catalyst and leaves the solution free from poisons during the main reduction with fresh catalyst.

The catalyst employed in the process may be platinum, palladium or their oxides, supported on charcoal, keiselguhr and the like. The catalyst may be prepared by the method given in Henke et al., U. S. Patent No. 2,285,277.

The concentration of the catalyst affects the rate of reduction, but it has been found that an equivalent of from 0.02% to 0.05% metal, based on the weight of the dinitrostilbene disodium sulfonate, is preferred.

The process operates satisfactorily at atmospheric pressure, although it will be understood that the partial pressure of hydrogen under such circumstances varies from about 200 to 500 mm. At temperatures above 90° C. and one atmosphere total pressure, the hydrogen partial pressure is so low that the rate of hydrogen absorption is too low to be commercially feasible. At temperatures below 70° C. the solubility of the nitro compound used as a starting material may cause it to crystallize out of solution, and the rate of reduction is reduced.

One essential feature of the invention is the regulated addition of the solution of the dinitrostilbene derivative to the reaction vessel. The solution must be added at such a rate that no appreciable excess of unreacted nitrobody is present. This addition may be done by increments, each of which is reduced before the next is added. It will be apparent that the size of the increments or the rate of addition will be determined by the rate of hydrogen absorption. When addition of the dinitro compound is not controlled, colored partial reduction products are formed in the reaction medium which coat the catalyst to reduce its activity as mentioned above.

The reaction mass should be agitated vigorously so that the hydrogen may be absorbed readily. When reduction is complete, the aqueous solution containing the diamino product is filtered from the catalyst as a lemon yellow liquid.

The product is relatively pure and does not turn red on exposure to air as it would if partially reduced nitro compounds were present. The filtrate may be obtained in the dry state from the solution by spray-drying. The process is adapted to be operated either batchwise, semi-continuously or continuously. In the latter case a portion of the reduction mass is removed from the system continuously with the catalyst which is filtered off and returned to the reaction vessel.

The following examples are given by way of illustration.

EXAMPLE I

A. *Preparation of feed solution of dinitrostilbene disodium sulfonate*

142.5 parts of 4,4'-dinitrostilbene-2,2'-disodium sulfonate (0.30 mol), 0.02 part of palladium metal supported on 0.66 part of carbon, and 500 parts of copper-free water heated to 85° to 90° C. to form a 20% solution of the disodium sulfonate. The pH of this solution is adjusted to 6.5 to 7.0 with dilute hydrochloric acid. The hot solution is clarified from the catalyst by filtration and is ready for use.

B. *Catalytic reduction of feed solution*

The hydrogenation is conducted at atmospheric pressure in a baffled 4 neck flask, which is equipped with an agitator whose stirrer shaft passes through a water-cooled gas-tight bearing, a thermometer reading in the range of 50° to 100° C., a jacket for heating and cooling the reaction flask, two meters for measuring hydrogen flow into and out of the reactor, a heated graduated cylinder equipped for controlled feeding of hot dinitro disodium sulfonate solution into the reducer, a water-cooled condenser, and a water bubbler (between the condenser and the vent gas meter) which serves as a manometer by showing pressure changes in the system.

Air in the flask and system is displaced with nitrogen and then with hydrogen. 250 parts of copper-free water and 0.06 part palladium supported on 2 parts of carbon are added and the slurry is agitated at 460 to 490 R. P. M. while heating to about 75° C. and passing hydrogen over the surface at about 0.5 to 0.75 cu. ft./hr. The hot dinitrostilbene disodium sulfonate solution is added in 20 to 25 ml. portions. Its rate of addition (about 150 to 160 ml./hr.) is established and controlled by the rate of hydrogen absorption (0.4 cu. ft./hr.). If the hydrogen feed rate is too rapid, the excess hydrogen is seen bubbling through at the water seal; and if the gas feed rate is too slow, a pressure drop (or "suck-back" on the water leg of the bubbler) is noted. The hydrogen flow rate is adjusted manually, so that no great excess of gas comes through the bubbler, and only a slight "such-back" is observed with each addition of nitro solution. In this manner nitro solution is added simultaneously with hydrogen as rapidly as reduction occurs. Table I indicates the reduction rates obtained.

TABLE I.—HYDROGENATION OF DINITROSTILBENE DISODIUM SULFONATE

[Total pressure: 1 atmosphere. Temperature: 75° C. Catalyst: Palladium on carbon. Agitation: 500 R. P. M.]

| Time | Hydrogen Absorbed cu. ft. | Dinitrostilbene Disodium Sulfonate Added, cc. |
|---|---|---|
| 0.5 hour | 0.18 | 80 |
| 1.0 hour | 0.38 | 160 |
| 1.5 hours | 0.59 | 240 |
| 2.0 hours | 0.80 | 320 |
| 3.15 hours | 1.23 | 500 |
| 3.65 hours | 1.40 | |
| 4.35 hours | 1.62 | |

The reduction liquor after reduction of the dinitrostilbene disodium sulfonate, when clarified by filtration from catalyst is lemon yellow in color. The liquors contain 13 to 13.5 g. of diamino stilbene disodium sulfonate per 100 cc. in practically quantitative yield from dinitro. The solution shows the characteristic U. V. absorption expected for diaminostilbene disodium sulfonate. When spotted on filter paper, the spot does not readily redden on exposure to air, showing that the product is free from impurities.

The free disulfonic acid is obtained from the liquors in 97% yield by acidification with dilute hydrochloric acid. When the liquor is spray-dried in a current of nitrogen at 700° F. with a chamber temperature of 210° F., a pale yellow water-soluble disodium salt is obtained which is of 92% purity.

EXAMPLE II

When the catalytic reduction described in Example I is carried out at 85° C. by adding dinitrosulfonate solution and hydrogen simultaneously to catalyst as described in Example I, reduction is complete in about 4 hours; but by adding hydrogen to a total mixture of the dinitro solution and suspended catalyst the reduction to diamine is not complete even in 10 hours. Further, the addition of more catalyst (0.01 to 0.02 g. Pd) at 2.5 and 4.6 hours elapsed time does not improve the reduction rate. The reduction liquors "spotted" on filter paper show a pronounced and heavy concentration of red colored material in and about the black colored catalyst spot.

The yellow solution which "bleeds" or separates from catalyst spot on the paper is rapidly oxidized in air and develops a deep red color.

Acidification of the reduction liquors obtained from the reaction on the mixture precipitates an orange red colored, impure diaminostilbene disulfonic acid, whereas acidification of the reduction with controlled addition of the dinitrostilbene derivative yielded a product as described in Example I.

EXAMPLE III

*Effect of excess alkalinity*

Reduction as described in Example I, of dinitrostilbene disodium sulfonate solution with a pH of 8.5 to 9.0 yields a solution which, after clarification from catalyst, is cherry red in color.

This liquor gives a spot on filter paper which is rapidly oxidized on exposure to air to red colored products. Acidification of these liquors precipitates an orange red colored diaminostilbene disulfonic acid, in only 80% yield.

EXAMPLE IV

*Effect of temperature and hydrogen partial pressure*

When the reduction is carried out as described in Example I, but at various temperatures the corresponding rates of hydrogen absorption showing in Table II are obtained:

TABLE II

| Temperature of Reduction | Calc. $H^2$ Partial Pressure, mm. Hg. | Rate of $H_2$ Absorption cu.ft./hr. |
|---|---|---|
| 73° to 73.5° C | 494 | 0.43 |
| 85° C | 326 | 0.40 |
| 92° C | 193 | 0.26 |

It is evident that the rate of hydrogen absorption decreases with increased temperature.

EXAMPLE V

*Use of platinum catalyst*

142.5 g. of dinitrostilbene disodium sulfonate in 625 ml. of water is reduced as in Example I, but with a slurry of 0.04 part of platinum on 4 parts of carbon.

The feed solution is added at 290 cc./hr. and the hydrogen absorption is 0.66 cu. ft./hr.

The hydrogen absorption for the reduction of both nitro groups is quantitative and no reduction of the stilbene double bond occurs.

Filter paper impregnated with a diluted solution of the reduction liquors shows a bright blue fluorescence in ultraviolet light characteristic of 4,4'-diamino-2,2'-disodium sulfonate.

It will be apparent that many widely different embodiments of this invention may be made without departing from the spirit and scope thereof, and therefore it is not intended to be limited except as indicated in the appended claims.

I claim:

1. The process of preparing 4,4'-diaminostilbene-2,2'-disodium sulfonate which comprises catalytically hydrogenating an aqueous solution of 4,4'-dinitrostilbene-2,2'-disodium sulfonate, at a total pressure of about one atmosphere, at a pH between 5.6 and 7.0 and at a temperature within the range of 70° to 90° C., in the presence of hydrogen and in the presence of a catalyst selected from the group consisting of platinum and palladium and their oxides, said solution being added, with agitation and simultaneous addition of said hydrogen, to a dispersion of said catalyst at a rate which maintains the reaction mass substantially free of unreduced dinitrostilbene disodium sulfonate, followed by recovering 4,4'-diaminostilbene-2,2'-disodium sulfonate from said reaction mass.

2. The process of claim 1 in which the catalyst is present in an amount of 0.2% to 0.5% of metal, based on the weight of the 4,4'-dinitrostilbene-2.2'-disodium sulfonate.

3. The process of claim 1 wherein the catalyst is filtered off and the resulting filtrate acidified to precipitate 4,4'-diaminostilbene-2,2'-disulfonic acid.

4. The process of preparing 4,4'-diaminostilbene-2,2'-disodium sulfonate which comprises preparing a hot 20% aqueous solution of 4,4'-dinitrostilbene-2,2'-disodium sulfonate, adjusting to a pH of 5.6 to 7.0 and maintaining the temperature within the range of 85° to 90° C., followed by adding said solution to a suspension of a platinum catalyst, with rapid agitation, and at a rate which maintains the reaction mass substantially free of unreduced dinitrostilbene disodium sulfonate, and simultaneously catalytically hydrogenating by passing an excess of hydrogen through said reaction mass at a total pressure of about one atmosphere, followed by filtering off the catalyst and recovering the 4,4'-diaminostilbene-2,2'-disodium sulfonate from the filtrate.

5. The process of claim 4 in which the filtrate is acidified to precipitate 4,4'-diaminostilbene-2,2'-disulfonic acid.

6. The process of claim 4 in which the filtrate is spray-dried.

References Cited in the file of this patent
UNITED STATES PATENTS

| | | |
|---|---|---|
| 360,553 | Bender | Apr. 5, 1887 |
| 1,880,594 | Tschunkur et al. | Oct. 4, 1932 |
| 2,212,084 | Straub et al. | Aug. 20, 1940 |
| 2,619,503 | Benner et al. | Nov. 25, 1952 |

OTHER REFERENCES

Green et al.: Ber. 30, 3100 (1897).